United States Patent Office 3,658,898
Patented Apr. 25, 1972

3,658,898
PROCESS FOR PRODUCING ADIPIC ACID
Guy Lartigau, Lyon, France, assignor to Rhone-Poulenc S.A., Paris, France
No Drawing. Filed Nov. 25, 1969, Ser. No. 879,894
Claims priority, application France, Nov. 27, 1968, 17,550; July 23, 1969, 25,147
Int. Cl. C07c 51/24
U.S. Cl. 260—537 P
12 Claims

ABSTRACT OF THE DISCLOSURE

Adipic acid is produced by oxidising 6-hydroperoxyhexanoic acid, preferably obtained from the by-products formed in the oxidation of cyclohexane with oxygen in the absence of a catalyst, with nitric acid.

The present invention relates to a process for producing adipic acid.

It is known to oxidise cyclohexane with gas mixtures containing molecular oxygen to give solutions in which the nature and proportion of the oxidation products vary considerably with the oxidation conditions. Thus, during the oxidation of cyclohexane by air in the liquid phase and in the presence of metallic catalysts such as cobalt derivatives, cyclohexanol and cyclohexanone are principally obtained. It is known to remove at least a part of the by-products formed during the oxidation, before distilling off the final products, by washing with water or an alkaline solution, either at the end of the oxidation or during or between the various stages of the oxidation. As well as monocarboxylic and dicarboxylic acids, these aqueous wash solutions essentially contain ε-hydroxy-caproic acid and polymers derived therefrom and it is known to subject them to oxidation with nitric acid, optionally after having removed the dissolved cyclohexanol and cyclohexanone by distillation and, where appropriate, after concentration.

It is furthermore known that cyclohexane oxidation products can be obtained in which the proportion of cyclohexyl hydroperoxide in the oxidised products is relatively high if certain conditions for carrying out the process are observed. Among these it has been proposed to conduct the oxidation without a catalyst, to allow the reagents a very short dwell time in the oxidising equipment, to work at relatively low temperatures, with low degrees of conversion and in an apparatus which does not catalyse the decomposition of the hydroperoxides. Along these lines, it has also been suggested to work in the presence of sequestering agents for metals or to treat the cyclohexane which is recycled to the oxidation zone with a basic reagent.

Despite these various measures, which undoubtedly help to increase the yield of cyclohexyl hydroperoxide in the oxidation products, a large amount of by-products forms during the oxidation. Among these by-products, only cyclohexanol, cyclohexanone and adipic acid have hitherto aroused interest because they are fundamental starting materials for chemical industry. Now, in view of the increasing importance assumed by the preparation of cyclohexane solutions of cyclohexyl hydroperoxide, the utilisation of the by-products which they contain other than those quoted above, has become very important.

The present invention provides a process for producing adipic acid which comprises oxidising 6-hydroperoxyhexanoic acid with nitric acid in an aqueous solution. Preferably the 6-hydroperoxyhexanoic acid used in the process is produced by washing with water a solution of cyclohexyl hydroperoxide, obtained by the oxidation of cyclohexane in the liquid phase in the absence of a metal catalyst with a gas containing molecular oxygen, and separating the aqueous phase containing 6-hydroperoxyhexanoic acid.

Thus, by the method of this invention adipic acid which may be used as a precursor of polyesters and polyamides is obtained. In addition, the cyclohexane solutions of cyclohexyl hydroperoxide treated in this way contain fewer by-products and are more suitable for certain applications.

Any cyclohexane oxidation product containing cyclohexyl hydroperoxide and prepared without a metallic catalyst can be treated by the new process but the benefit derived from this treatment is the greater the higher the content of hydroperoxide in the oxidised product. In particular the invention is advantageously applied to the treatment of cyclohexane solutions of cyclohexyl hydroperoxide in which the oxidation products which are less volatile than cyclohexane contain at least 50% by weight of peroxidic products. Such solutions can be prepared by the process described in French patent specification No. 1,505,363 as well as by the first stage of the process described in U.S. patent specification No. 2,931,834. These solutions may be concentrated before washing by any known technique.

The washing with water is generally effected in the liquid phase at 5° to 100° C. preferably 15° to 30° C., where necessary under autogenous pressure, or under pressure created by an inert gas such as nitrogen if the teperature employed is above the boiling point of the water-cyclohexane azeotrope. The weight of water used is generally 0.01 to 1 times, and preferably 0.05 to 0.5 times, the weight of solution to be washed. Any conventional technique for washing in the liquid phase can be used, and the operation can be carried out continuously or discontinuously.

Before it is subjected to the oxidation with nitric acid, the 6-hydroperoxyhexanoic acid obtained from the cyclohexane oxidation product can be purified. This purification can for example comprise extraction of the aqueous wash solutions with a water-immiscible alcohol, ester or ketone. The alcohols which can be used include alkanols having 4 to 10 carbon atoms, cycloalkanols having 5 to 8 carbon atoms in the ring and optionally substituted by one or more alkyl groups having 1 to 4 carbon atoms, and phenylalkanols having 7 to 10 carbon atoms. The ketones which can be used, include dialkylketones having 4 to 12 carbon atoms, cycloalkanones having 5 to 8 carbon atoms in the ring optionally substituted by alkyl groups having 1 to 4 carbon atoms each, phenylalkylketones and cycloalkylalkylketones having 8 to 10 carbon atoms. Among the esters which can be used in the new process, those derived from alkylcarboxylic acids having 2 to 8 carbon atoms and alkanols having 1 to 4 carbon atoms are preferably chosen. Particular examples of extracting agents which meet the criteria enumerated above are ethyl acetate, amyl acetate, butyl propionate, methyl-2-ethylhexanoate, the amyl alcohols, 2-ethylhexanol, 3-methyl-pentanol-2, the methylcyclohexanols, methyl ethyl ketone, methyl isobutyl ketone, cyclohexanone, acetophenone and methyl propyl ketone. The extraction process can be carried out at 10° to 30° C. and weights of extracting agent which are 0.5 to 5 times the weight of aqueous solution to be extracted can be used.

The purification can be completed by removing the extracting agent, preferably under reduced pressure and at a temperature below 50° C. This operation can be carried out in several stages, with the diacids which precipitate from the concentrated solution, where appropriate after cooling, being removed between two stages, for example by filtration.

The residue can optionally be further purified by dissolution in water, formation of the sodium salt of 6-hydroperoxyhexanoic acid, for example by addition of sodium bicarbonate, washing of the aqueous solution with a liquid hydrocarbon such as cyclohexane and then, after acidification, extraction of the 6-hydroperoxyhexanoic acid, using one of the extracting agents defined above.

According to a preferred embodiment of the new process, an aqueous solution of 6-hydroperoxyhexanoic acid, in which the concentration of the acid may vary within wide limits without affecting the oxidation but is generally above 5% by weight, is subjected to the treatment with nitric acid. This aqueous solution may be obtained by dissolving the purified 6-hydroperoxyhexanoic acid in water. It is also possible to use the aqueous wash solutions obtained from washing solutions of cyclohexylhydroperoxide obtained by the oxidation of cyclohexane, directly.

Before these aqueous wash solutions are subjected to the nitric acid treatment, the small amounts of cyclohexyl hydroperoxide, cyclohexanol and cyclohexanone present in them can be extracted using a liquid hydrocarbon such as cyclohexane. The solutions can also be concentrated beforehand, preferably under reduced pressure and at a temperature not exceeding 50° C., and the diacids which precipitate are then separated off, optionally after cooling.

The aqueous nitric acid solutions used generally are 40% to 65%, preferably 45% to 55%, by weight. A molar excess of nitric acid, which in practice ranges from 4 to 8 mols per mol of 6-hydroperoxyhexanoic acid employed, should be used.

The nitric acid treatment is preferably effected in the presence of a catalyst based on vanadium, optionally combined with copper, cobalt, titanium, nickel, chromium, molybdenum or cerium. Vanadic acid and sodium or ammonium metavanadate are preferred catalysts. In practice the catalyst is mixed with the aqueous nitric acid solution at the rate of 0.02 to 0.2 gram atoms of vanadium per litre of acid solution, regardless of its concentration.

Preferably, at least a part of the treatment with nitric acid is carried out in the presence of nitrogen peroxide. This peroxide can be pre-formed or produced within the reaction medium, for example by adding a nitrite such as sodium nitrite. The amount of nitrogen peroxide used relative to the 6-hydroperoxyhexanoic acid employed may vary within very wide limits depending on the practical employed for carrying out the process.

According to one preferred embodiment of the process, the 6-hydroperoxyhexanoic acid and the nitrogen peroxide or its precursor are added simultaneously to an aqueous solution of nitric acid. In this case generally 2 to 4 mols of nitrogen peroxide per mole of 6-hydroperoxyhexanoic acid are used. To avoid an uncontrolled reaction, it is advisable to introduce the reagents gradually and to provide an efficient device for removing the heat produced and maintaining the mixture at the temperature adopted, which is generally 10° C. to 30° C. When the addition of the reagents is complete, the mixture is kept at this temperature for 30 to 90 minutes and then at 80° C. to 100° C. for 20 to 60 minutes.

According to another preferred embodiment of the process, the 6-hydroperoxyhexanoic acid is first brought into contact at a temperature of 15° to 30° C. with an aqueous solution of nitric acid which is free of nitrogen oxide and contains a catalyst (the nature and proportion of which have been defined above). Generally 3 to 6 mols of HNO₃ are used per mol of 6-hydroperoxyhexanoic acid, the contact being maintained at least until the hydroperoxide groups have been decomposed, i.e. for about 30 to 60 minutes. The resulting solution is then gradually introduced into an aqueous solution of nitric acid containing a catalyst (the nature and proportion of which have been defined above) and a small amount of the order of 0.001 to 0.01 mol per mol of 6-hydroperoxyhexanoic acid initially employed of nitrogen peroxide or a precursor thereof. The mixture is preferably reacted at 10° C. to 30° C. and after several hours at this temperature it may then be heated to 80° C. to 200° C. for about 20 to 60 minutes. The amount of nitric acid used in this second stage is such that the total amount used corresponds to the criteria laid down in the definition of the general conditions of the process.

Regardless of the embodiment adopted for the treatment with nitric acid, the adipic acid can then be isolated from the reaction mixture by any known means. For example, the mixture can be cooled to about 0° C. to cause the adipic acid to crystallise, and the crystals then filtered off and washed with water. The adipic acid remaining in the mother liquors can be recovered by extraction with an appropriate solvent or by successive crystallisations after removal of the dissolved nitrogen peroxide and concentration of the liquors.

The following examples illustrate the invention. In these examples the molar consumption of nitric acid per mol of compound to be oxidised is determined by measuring the amount of acid which has disappeared and deducting from this the amount of NO and $NO_2$ formed during the reaction, these latter materials being recovered by flushing air, oxygen or nitrogen over the reaction mixture.

EXAMPLE 1

(a) 368 g. of water at 25° C. are added to 9370 g. of a cyclohexane solution of hydroperoxide, obtained by oxidising cyclohexane in the liquid phase without a catalyst with air of lowered oxygen content and pre-concentrating. The mixture is stirred for about 1 minute and the aqueous phase is separated from the organic phase. This procedure is then repeated twice.

The aqueous solutions thus obtained are combined and twice washed, using 2× 460 ml. of cyclohexane. The aqueous solution, weighing 1227 g., is retained. Determination carried out on an aliquot of the aqueous solution shows that it contains 0.76 mol of 6-hydroperoxyhexanoic acid and 0.09 mol of adipic acid.

650 g. of this aqueous solution are extracted four times at 25° C., using 4× 100 ml. of ethyl acetate, and the combined oragnic phases are dried over sodium sulphate. The solution is then filtered and the solvent evaporated by heating the solution to 30° C. under a pressure which is gradually reduced to a final pressure of 1 mm. of mercury. Finally, 62 g. of a white pasty solid containing 47 g. of 6-hydroperoxyhexanoic acid and 8.7 g. of adipic acid remain.

The cyclohexane solution of hydroperoxides employed was prepared by the process described in French patent specification No. 1,491,518, the degree of conversion at the outlet of the last oxidising reactor being 4.1%. The solution contains 21% by weight of oxidation products and 14.3% by weight of hydroperoxides.

(b) 58.9 ml. of aqueous nitric acid solution containing 51% by weight of HNO₃ and also containing 0.05 gram atoms of vanadium in the form of sodium metavanadate per litre, are introduced into a 250 ml. flask fitted with a stirred, a thermometer, a dropping funnel and a gas inlet tube. 14.4 g. of sodium nitrite, and 15 g. of a solution prepared from 2.35 g. of water and 15.5 g. of the solid obtained in (a) are simultaneously added to this solution over the course of 35 minutes, while the mixture is stirrer, a thermometer, a dropping funnel and a gas inlet by cooling the flask with iced water. The mixture is stirred for 1 hour at 20° C. and then its temperature is gradually raised to 95° C. and it is maintained at this temperature for 45 minutes. Throughout the operation, a stream of air is introduced over the reaction mixture at the rate of 10 l./hour and then passed to the absorbers where the amount of NO and $NO_2$ formed during the reaction is measured. 3.3 g. of adipic acid are isolated by filtration from the mixture after it has been cooled to 0° C.

The diacids remaining in solution in the mother liquors are continuously extracted with diethyl ether and then determined by vapour phase chromatography of their methyl esters. In this way it is found that the mother liquors contained 2 g. of adipic acid, 4.45 g. of glutaric acid and 1.6 g. of succinic acid.

The consumption of nitric acid is 1.94 mols of $HNO_3$ per mol of 6-hydroperoxyhexanoic acid.

EXAMPLE 2

(a) 4 kg. of water are added at 25° C. to 40.7 kg. of a cyclohexane solution of hydroperoxide, obtained by oxidation of cyclohexane in the liquid phase without a catalyst with air of lowered oxygen content and pre-concentrating. The mixture is stirred for about 1 minute and the aqueous phase is separated from the organic phase. This procedure is then repeated twice.

2760 g. of the aqueous phase are washed with 2× 1500 ml. of cyclohexane. The aqueous solution is retained and extracted at 25° C. with 3× 160 ml. of ethyl acetate. The combined organic phases are then dried over sodium sulphate. After filtration, the solvent is removed by heating the solution to 30° C. under a pressure, which is progressively reduced to a final pressure of 1 mm. of mercury. 30 ml. of water and sodium bicarbonate, until the mixture is neutral, are added to the residue. The solution thus obtained is washed with 200 ml. of cyclohexane; the aqueous phase is retained and 5 N hydrochloric acid is added thereto until it has a pH of 2. This solution is extracted with 400 ml. of ethyl acetate and the organic phase is retained. The solvent is removed from this organic phase by distillation at 30° C. under a pressure progressively reduced to 1 mm. of mercury. 21 g. of a white pasty solid containing 19.1 g. of 6-hydroperoxyhexanoic acid and 0.15 —COOH groups finally remain.

The cyclohexane solution of hydroperoxide employed was prepared by the process described in French patent specification No. 1,491,518, the degree of conversion at the outlet of the last oxidising reactor being 4.02%. The solution contains 21.5% by weight of oxidation products and 14% by weight of hydroperoxides.

(b) 0.2 g. of urea (to remove the oxides of nitrogen) are added to 15 ml. of an aqueous solution of nitric acid containing 63.7% by weight of $HNO_3$ and also 0.05 gram atoms of vanadium, in the form of sodium metavanadate per litre. After 15 minutes, 11.5 g. of an aqueous solution containing 9.7 g. of the pasty white solid isolated under (a) is added, the temperature being kept at 20° C. The mixture is then stirred for 1 hour at this temperature.

(c) 15 ml. of an aqueous nitric acid solution containing 63.7% by weight of $HNO_3$ and also 0.05 gram atoms of vanadium in the form of sodium metavanadate, per litre, are introduced into a 250 ml. flask fitted with a stirrer, a thermometer, a dropping funnel and a gas inlet tube. 0.34 g. of sodium nitrite are added to this solution and then the solution obtained under (b) is added over 30 minutes with stirring, the temperature being kept at about 20° C. The final solution is stirred for 3 hours at 20° C. and the temperature is raised to 90° C. and the solution kept at this temperature for 1 hour.

During the entire operation, a stream of air is passed over the reaction mixture at the rate of 10 l./hour and is then passed to the absorbers where the NO and $NO_2$ formed during the reaction are determined.

1.63 g. of adipic acid are isolated by filtration, from the mixture after it has been cooled to 0° C.

The diacids remaining in solution in the mother liquors are determined by vapour phase chromatography of their methyl esters. After continuous extraction with diethyl ether, it is thus found that the mother liquors still contain 2.61 g. of adipic acid, 3.65 g. of glutaric acid and 1.05 g. of succinic acid.

The nitric acid consumption is 1.2 mols of $HNO_3$ per mol of 6-hydroperoxyhexanoic acid.

I claim:

1. A process for producing adipic acid which comprises oxidising 6-hydroperoxyhexanoic acid with nitric acid in aqueous solution.

2. A process according to claim 1, wherein the 6-hydroperoxyhexanoic acid is introduced into the reaction mixture as an aqueous solution containing more than 5% by weight 6-hydroperoxyhexanoic acid.

3. A process according to claim 1, wherein the nitric acid is introduced into the reaction mixture as an aqueous solution containing 40 to 65% by weight of nitric acid.

4. A process according to claim 1, wherein 4 to 8 mols of nitric acid per mol of 6-hydroperoxyhexanoic acid are used.

5. A process according to claim 1 wherein the oxidation is carried out in the presence of a vanadium catalyst which is soluble in nitric acid.

6. A process according to claim 1, wherein the oxidation is carried out in the presence of nitrogen peroxide.

7. A process for producing adipic acid which comprises oxidising cyclohexane in the liquid phase in the absence of a metal catalyst with a gas containing molecular oxygen to give a solution of cyclohexylhydroperoxide, washing with water the said solution of cyclohexylhydroperoxide, separating the aqueous phase containing 6-hydroperoxyhexanoic acid and oxidising the 6-hydroperoxyhexanoic acid with nitric acid in aqueous solution.

8. A process according to claim 7, wherein the washing with water is effected at 15 to 30° C., the weight of water being 0.05 to 0.5 times the weight of solution to be washed.

9. A process according to claim 7, wherein the aqueous wash phase is extracted with a hydrocarbon which is liquid under the working conditions.

10. A process according to claim 7, wherein the aqueous wash phase containing 6-hydroperoxyhexanoic acid is subjected directly to the oxidation with nitric acid.

11. A process according to claim 7, wherein the aqueous wash phase is extracted with a water-immiscible alcohol, ester or ketone, and the 6-hydroperoxyhexanoic acid so extracted is then oxidised with nitric acid.

12. A process according to claim 11, wherein the extraction with the alcohol, ester or ketone is carried out at 10 to 30° C., using 0.5 to 5 times the weight of the aqueous wash solution.

References Cited

UNITED STATES PATENTS

| | | | |
|---|---|---|---|
| 2,717,264 | 9/1955 | Rust et al. | 260—488 |
| 2,782,219 | 2/1957 | Cleaver | 260—537 P |

JAMES A. PATTEN, Primary Examiner

V. GARNER, Assistant Examiner

U.S. Cl. X.R.

260—531 R, 533 C, 610 R